US008051036B2

(12) United States Patent
Klein et al.

(10) Patent No.: US 8,051,036 B2
(45) Date of Patent: Nov. 1, 2011

(54) METHOD AND APPARATUS FOR MANAGEMENT AND UPDATING OF DISTRIBUTED USER DATABASES

(75) Inventors: Thierry Etienne Klein, Fanwood, NJ (US); Charles Payette, Oceanport, NJ (US)

(73) Assignee: Alcatel Lucent, Paris (FR)

( * ) Notice: Subject to any disclaimer, the term of this patent is extended or adjusted under 35 U.S.C. 154(b) by 1160 days.

(21) Appl. No.: 11/769,995

(22) Filed: Jun. 28, 2007

(65) Prior Publication Data
US 2009/0007238 A1    Jan. 1, 2009

(51) Int. Cl.
*G06F 17/00* (2006.01)
*G06F 7/00* (2006.01)
(52) U.S. Cl. ......... 707/614; 707/641; 707/959; 707/966
(58) Field of Classification Search .................. None
See application file for complete search history.

(56) References Cited

U.S. PATENT DOCUMENTS

| | | | | |
|---|---|---|---|---|
| 5,570,412 | A * | 10/1996 | LeBlanc | 455/456.2 |
| 6,091,957 | A * | 7/2000 | Larkins et al. | 455/456.2 |
| 6,363,138 | B1 * | 3/2002 | Aprile | 379/45 |
| 6,498,839 | B2 * | 12/2002 | Rojas | 379/112.01 |
| 7,433,338 | B2 * | 10/2008 | Nieminen et al. | 370/331 |
| 7,450,694 | B2 * | 11/2008 | Cacioppo et al. | 379/45 |
| 7,711,094 | B1 * | 5/2010 | Olshansky et al. | 379/45 |
| 7,787,600 | B1 * | 8/2010 | Bari | 379/45 |
| 7,912,204 | B1 * | 3/2011 | Rangarajan et al. | 379/221.01 |
| 2002/0012423 | A1 * | 1/2002 | Rojas | 379/67.1 |
| 2004/0151292 | A1 * | 8/2004 | Larsen | 379/114.2 |
| 2005/0003797 | A1 * | 1/2005 | Baldwin | 455/404.1 |
| 2005/0177733 | A1 * | 8/2005 | Stadelmann et al. | 713/185 |
| 2005/0254652 | A1 * | 11/2005 | Engler et al. | 380/270 |
| 2006/0223493 | A1 * | 10/2006 | Freund | 455/404.2 |
| 2007/0083470 | A1 * | 4/2007 | Bonner et al. | 705/51 |
| 2008/0013523 | A1 * | 1/2008 | Nambakkam | 370/352 |
| 2008/0090546 | A1 * | 4/2008 | Dickinson et al. | 455/404.1 |
| 2008/0183713 | A1 * | 7/2008 | Al-Attas et al. | 707/9 |

OTHER PUBLICATIONS

"911-NOW: A Network on Wheels for Emergency Response and Disaster Recovery Operations," David Abusch-Magder et al, Bell Labs Technical Journal, Special Issue: Wireless Network Technology Issue Edited by Joseph A. Tarallo and James S. Peterson; published by Wiley InterScience; vol. 11, Issue 4, pp. 113-133, Mar. 9, 2007.

* cited by examiner

*Primary Examiner* — Greta Robinson
*Assistant Examiner* — James J Wilcox
(74) *Attorney, Agent, or Firm* — Wall & Tong, LLP

(57) ABSTRACT

The invention includes a method and apparatus for authenticating a visiting node in a wireless network. A method includes receiving a request to transfer a user database of a visiting node, obtaining the visiting node user database from the visiting node in response to a determination to update a master user database to include the visiting node user database, and merging the visiting node user database with the master user database. The request to transfer the visiting node user database is received, from the visiting node, at a primary authentication node of the network. The visiting node user database includes entries for users associated with the visiting node. The master user database includes entries for users associated with nodes authenticated by the primary authentication node of the network.

20 Claims, 6 Drawing Sheets

US 8,051,036 B2

METHOD AND APPARATUS FOR MANAGEMENT AND UPDATING OF DISTRIBUTED USER DATABASES

FIELD OF THE INVENTION

The invention relates to the field of communication networks and, more specifically, to wireless networks.

BACKGROUND OF THE INVENTION

Emergency response organizations increasingly depend on wireless communication technology to provide communication during emergencies. Disadvantageously, however, emergencies often result in damage to, or sometimes even destruction of, existing network infrastructure, thereby preventing communications between emergency personnel. In other words, the existing communications infrastructure lacks survivability. Furthermore, even if portions of the existing communications infrastructure do survive the emergency, the existing communications infrastructure may not be able to handle the increased traffic load typical during emergencies. Specifically, remaining portions of the existing communication infrastructure may be overloaded as emergency personnel, and the general public, attempt various types of communications. Such deficiencies became clear during the events of Sep. 11, 2001, and again during the events of Hurricane Katrina.

In fixed networks, visiting users to the fixed network are granted access using a pair of Authentication, Authorization, and Accounting (AAA) servers; namely, a home AAA server and a visitor AAA server. Specifically, in fixed networks, in order to grant access to visiting users, the visited AAA server operates as a proxy server that communicates with the visitor's home AAA server. Disadvantageously, while this existing procedure is reliable for fixed networks, it is quite unreliable for non-fixed, ad-hoc networks. The procedure is unreliable for non-fixed, ad-hoc networks because there is no guarantee that the visitor AAA server will be available throughout the lifetime of the ad-hoc network or that connectivity to the visitor AAA server will be maintained throughout the lifetime of the ad-hoc network.

SUMMARY OF THE INVENTION

Various deficiencies in the prior art are addressed through the invention of a method and apparatus for authenticating a visiting node in a wireless network. A method includes receiving a request to transfer a user database of a visiting node, obtaining the visiting node user database from the visiting node in response to a determination to update a master user database to include the visiting node user database, and merging the visiting node user database with the master user database. The request to transfer the visiting node user database is received, from the visiting node, at a primary authentication node of the network. The visiting node user database includes entries for users associated with the visiting node. The master user database includes entries for users associated with nodes authenticated by the primary authentication node of the network.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is described within the context of a rapidly deployable wireless network (denoted herein as a 911 network on wheels, i.e., 911-NOW network); however, the present invention is applicable to various other networks. A 911-NOW network is formed by placing a 911-NOW node(s) on a mobile platform(s) such that when the mobile platform(s) is dispatched to a network site, the 911-NOW node(s) provides a wireless communication network. As described herein, one or more 911-NOW nodes may be deployed to form a wireless network. The 911-NOW network may be a standalone wireless network that is independent of existing network infrastructure or an integrated wireless network that utilizes existing network infrastructure.

Figure 1:
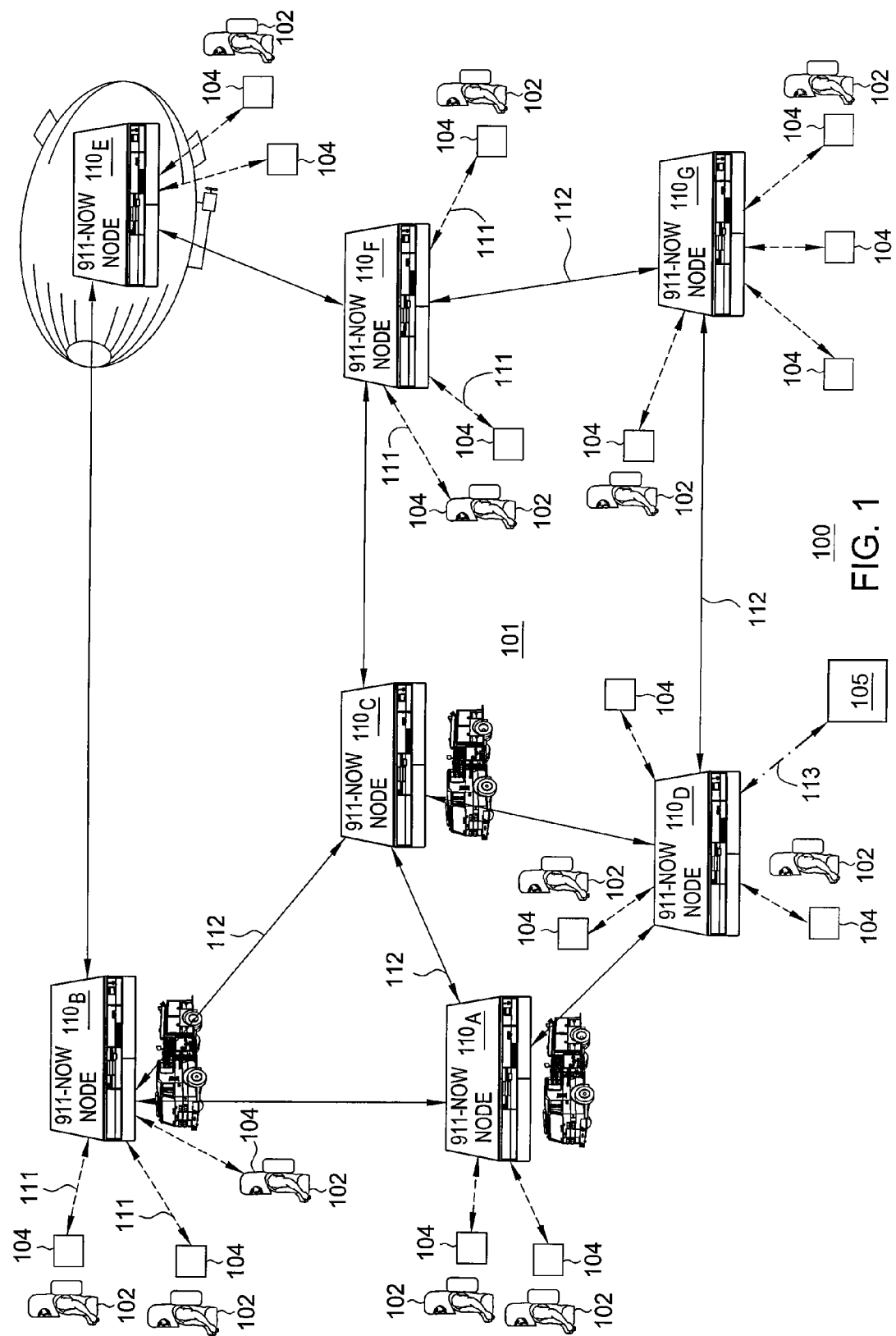
FIG. 1 depicts a standalone 911-NOW communication network architecture that is independent of any existing network infrastructure.

FIG. 1 depicts a standalone 911-NOW communication network architecture that is independent of any existing network infrastructure. Specifically, standalone 911-NOW communication network architecture 100 includes a plurality of 911-NOW nodes 110$_A$-110$_G$ (collectively, 911-NOW nodes 110) supporting wireless communications at an emergency site 101. The standalone 911-NOW communication network architecture 100 provides a fully-functional network since each of the 911-NOW nodes 110 supports radio access network (RAN) functions, core networking functions, and services. As depicted in FIG. 1, each of the 911-NOW nodes 110 is placed or mounted on a mobile platform and transported to emergency site 101. The 911-NOW nodes 110 form a wireless network at emergency site 101.

The emergency site 101 may be any location or combination of locations at which a wireless network is required. The emergency site 101 may be a localized site, a collection of localized sites, a widespread site, a collection of widespread sites, and the like, as well as various combinations thereof. For example, emergency site 101 may be a single location, multiple locations within a town or city, or even span one or more counties, states, countries, or even continents. The 911-NOW network is not limited by the scope of the emergency site. The emergency site 101 may be associated with any type of emergency. For example, emergency site 101 may be associated with a natural disaster (e.g., a flood, a hurricane, a tornado, and the like), a manmade disaster (e.g., a chemical spill, a terrorist attack, and the like), and the like, as well as various combinations thereof.

As depicted in FIG. 1, emergency personnel (denoted herein as users 102 of the 911-NOW network 100) have responded to the emergency. The users 102 are performing various different functions at different areas of emergency site 101. For example, the users may be containing the disaster, participating in evacuation operations, participating in search and rescue operations, and the like, as well as various combinations thereof. The users 102 use equipment in responding to the emergency, including equipment capable of receiving and sending information wirelessly (denoted herein as wireless user devices 104 of users 102). The wireless user devices 104 include communication equipment, and may include various other types of emergency equipment (depending on the type of emergency, severity of the emergency, logistics of the emergency site, and various other factors).

For example, wireless user devices 104 may include wireless devices carried by emergency personnel for communicating with other emergency personnel, receiving information for use in responding at the emergency site, collecting information at the emergency site, monitoring conditions at the emergency site, and the like, as well as various combinations thereof. For example, wireless user devices 104 may include devices such as walkie-talkies, wireless headsets, cell phones, personal digital assistants (PDAs), laptops, and the like, as well as various combinations thereof. The wireless user devices 104 may include various other equipment, such as monitors (e.g., for monitoring breathing, pulse, and other characteristics; for monitoring temperature, precipitation, and other environmental characteristics; and the like), sensors (e.g., for detecting air-quality changes, presence of chemical or biological agents, radiation levels, and the like), and various other equipment.

As depicted in FIG. 1, a 911-NOW-based network is established at the emergency site 101 by deploying 911-NOW nodes 110 (illustratively, 911-NOW nodes $110_A$-$110_G$) to emergency site 101. The 911-NOW nodes 110 may be deployed using mobile platforms. The 911-NOW nodes 110 may be deployed using standalone mobile platforms. For example, 911-NOW nodes 110 may be placed in backpacks, suitcases, and like mobile cases which may be carried by individuals. The 911-NOW nodes 110 may be deployed using mobile vehicles, including land-based vehicles, sea-based vehicles, and/or air-based vehicles. For example, 911-NOW nodes may be placed (and/or mounted) on police cars, swat trucks, fire engines, ambulances, humvees, boats, helicopters, blimps, airplanes, unmanned drones, satellites, and the like, as well as various combinations thereof. The 911-NOW nodes 110 may be deployed using various other mobile platforms.

As depicted in FIG. 1, 911-NOW node $110_A$ is deployed using a fire engine, 911-NOW node $110_B$ is deployed using a fire engine, 911-NOW node $110_C$ is deployed using a fire engine, 911-NOW node $110_D$ is deployed as a standalone node, 911-NOW node $110_E$ is deployed using a blimp, 911-NOW node $110_F$ is deployed as a standalone node, and 911-NOW node $110_G$ is deployed using a fire engine. The inherent mobility of 911-NOW nodes 110 enables quick and flexible deployment of a wireless network as needed (e.g., when, where, and how the wireless network is needed), thereby providing scalable capacity and coverage on-demand as required by the emergency personnel. Since each 911-NOW node 110 supports RAN functions, core networking functions, and various service functions, deployment of even one 911-NOW node produces a fully-functional wireless network.

As depicted in FIG. 1, the 911-NOW nodes 110 support wireless communications for wireless user devices 104 (denoted herein as wireless access communications). The wireless access communications include wireless communications between a 911-NOW node 110 and wireless user devices served by that 911-NOW node 110. A 911-NOW node 110 includes one or more wireless access interfaces supporting wireless communications for wireless user devices 104 using respective wireless access connections 111 established between wireless user devices 104 and 911-NOW nodes 110. The 911-NOW nodes 110 further support mobility of user devices 104 at emergency site 101 such that, as users 102 move around emergency site 101, communication sessions between wireless user devices 104 of those users 102 and 911-NOW nodes 110 are seamlessly transferred between 911-NOW nodes 110.

As depicted in FIG. 1, the 911-NOW nodes 110 support wireless communications between 911-NOW nodes 110 (denoted herein as wireless mesh communications). The wireless mesh communications include wireless communications between 911-NOW nodes, including information transported between wireless user devices 104, control information exchanged between 911-NOW nodes 110, and the like, as well as various combinations thereof. A 911-NOW node 110 includes one or more wireless mesh interfaces supporting wireless communications with one or more other 911-NOW nodes 110. The wireless mesh communications between 911-NOW nodes 110 are supported using wireless mesh connections 112 established between 911-NOW nodes 110.

As depicted in FIG. 1, the following pairs of 911-NOW nodes 110 communicate using respective wireless mesh connections 112: 911-NOW nodes $110_A$ and $110_B$, 911-NOW nodes $110_A$ and $110_C$, 911-NOW nodes $110_A$ and $110_D$, 911-NOW nodes $110_B$ and $110_C$, 911-NOW nodes $110_C$ and $110_D$, 911-NOW nodes $110_B$ and $110_E$, 911-NOW nodes $110_C$ and $110_F$, 911-NOW nodes $110_D$ and $110_G$, 911-NOW nodes $110_E$ and $110_F$, and 911-NOW nodes $110_F$ and $110_G$. As such, 911-NOW nodes 110 of FIG. 1 communicate to form a wireless mesh network. Although a specific wireless mesh configuration is depicted and described with respect to FIG. 1, 911-NOW nodes 110 may communicate to form various other wireless mesh configurations, and mesh configurations may be modified in real-time as conditions change.

As depicted in FIG. 1, the 911-NOW nodes 110 support wireless communications for one or more management devices 105 (denoted herein as wireless management communications). The wireless management communications include wireless communications between a 911-NOW node 110 and a management device(s) 105 served by that 911-NOW node 110. A 911-NOW node 110 includes one or more wireless management interfaces supporting wireless communications for management device(s) 105. The wireless management communications between management device 105 and 911-NOW node $110_D$ are supported using a wireless management connection 113 established between management device 105 and 911-NOW node $110_D$.

The management device 105 is operable for configuring and controlling standalone 911-NOW network 100. For example, management device 105 may be used to configure and reconfigure one or more of the 911-NOW nodes 110, control access to the 911-NOW nodes, control functions and services supported by the 911-NOW nodes 110, upgrade 911-NOW nodes 110, perform element/network management functions for individual 911-NOW nodes or combinations of 911-NOW nodes (e.g., fault, performance, and like management functions) and the like, as well as various combinations thereof. The management device 105 may be implemented using existing devices (e.g., laptops, PDAs, and the like), or using a newly-designed device adapted to support such management functions. The management device 105 may connect to one or more 911-NOW nodes 110 directly and/or indirectly using wireline and/or wireless interfaces.

The 911-NOW nodes 110 support wireless communications using one or more wireless technologies. For wireless access communications, each 911-NOW node 110 may support one or more different wireless technologies, such as Global System for Mobile Communications (GSM), General Packet Radio Service (GPRS), Evolution—Data Optimized (1×EV-DO), Universal Mobile Telecommunications System (UMTS), High-Speed Downlink Packet Access (HSDPA), Worldwide Interoperability for Microwave Access (WiMAX), and the like. For wireless mesh communications, each 911-NOW node 110 may support Wireless Fidelity (WiFi) or WiMAX technology, microwave technologies, or any other wireless technology. For wireless management communications, each 911-NOW node 110 may support one or more such cellular technologies, and, further, may support WiFi technology, Bluetooth technology, or any other wireless technology.

The wireless communications supported by 911-NOW nodes 110 convey user information, control information, and the like, as well as various combinations thereof. For example, user information may include voice communications (e.g., voice calls, audio conferences, push-to-talk, and the like), data communications (e.g., text-based communications, high-speed data downloads/uploads, file transfers, and the like), video communications (e.g., video broadcasts, conferencing, and the like), multimedia communications, and the like, as well as various combinations thereof. The communications supported by 911-NOW nodes 110 may convey various combinations of content, e.g., audio, text, image, video, multimedia, and the like, as well as various combinations thereof. For example, control information may include network configuration information, network control information, management information and the like, as well as various combinations thereof. Thus, 911-NOW nodes 110 support wireless communication of any information.

Although a specific number of 911-NOW nodes 110 is depicted and described as being deployed to form a 911-NOW network, fewer or more 911-NOW nodes may be deployed to form a 911-NOW network supporting communications required to provide an effective emergency response. Similarly, although a specific configuration of 911-NOW nodes 110 is depicted and described as being deployed to form a 911-NOW network, 911-NOW nodes may be deployed in various other configurations (including different locations at one emergency site or across multiple emergency sites, different combinations of mesh connections between 911-NOW nodes, and the like, as well as various combinations thereof) to form a standalone 911-NOW network supporting RAN functions, CORE networking functions, and various services supporting multimedia communications to provide an effective emergency response.

As described herein, although one or more 911-NOW nodes 110 are capable of forming a fully-functional standalone mesh wireless network without relying on existing infrastructure (fixed or variable), where there is existing infrastructure (that was not damaged or destroyed), the standalone 911-NOW wireless network may leverage the existing network infrastructure to form an integrated 911-NOW wireless network capable of supporting various additional capabilities (e.g., supporting communications with one or more other standalone 911-NOW wireless networks, supporting communications with one or more remote emergency management headquarters, supporting communications with other resources, and the like, as well as various combinations thereof). An integrated 911-NOW wireless network including a mesh 911-NOW network in communication with existing network infrastructure is depicted and described herein with respect to FIG. 2.

Figure 2:
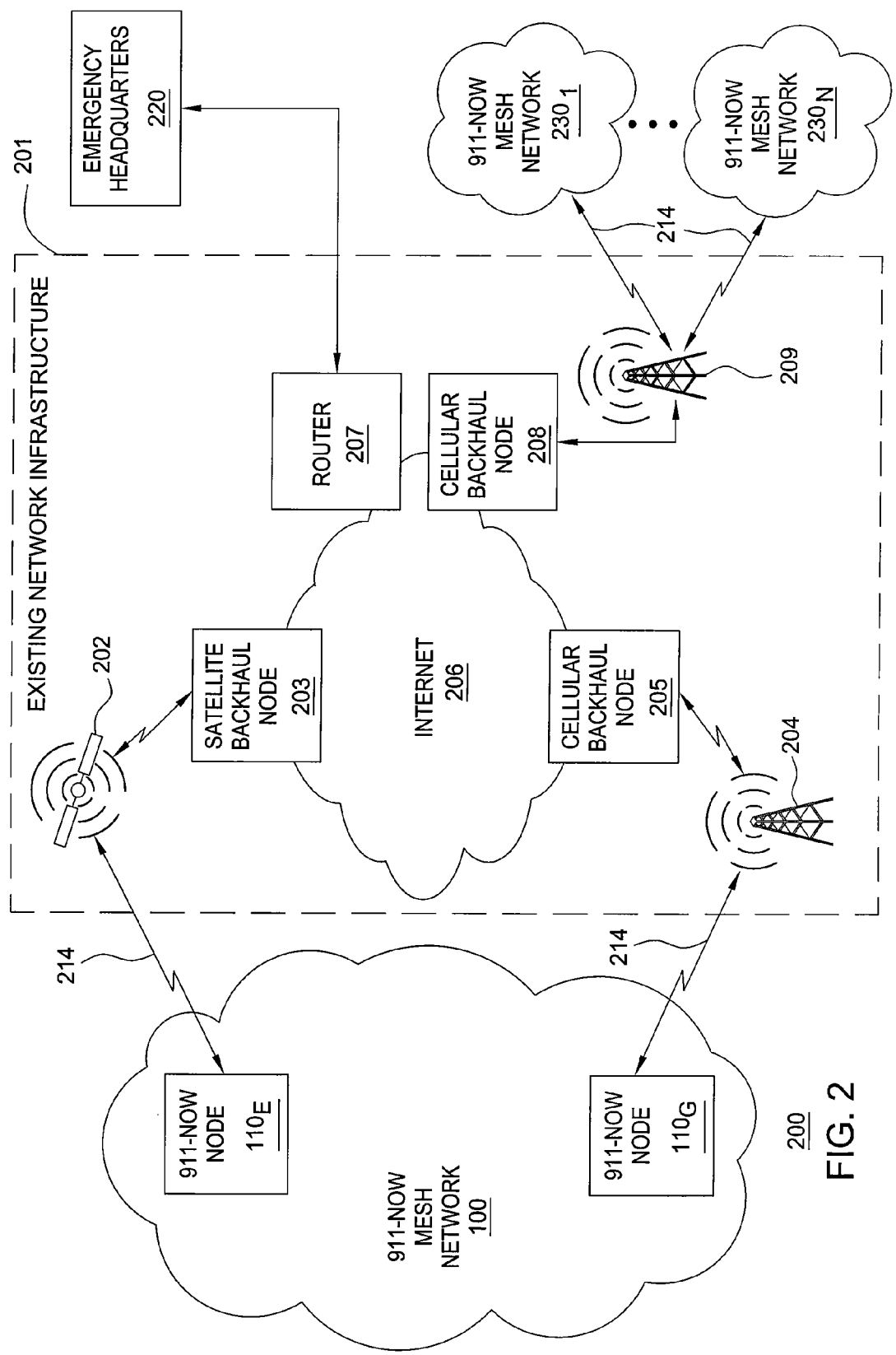
FIG. 2 depicts an integrated 911-NOW communication network architecture that utilizes a 911-NOW mesh network and an existing network infrastructure.

FIG. 2 depicts an integrated 911-NOW communication network architecture including a 911-NOW mesh network and an existing network infrastructure. Specifically, the integrated 911-NOW communication network architecture 200 includes 911-NOW mesh network 100 (depicted and described with respect to FIG. 1) and existing network infrastructure 201. The existing network infrastructure 201 may include any existing communications infrastructure adapted for supporting communications for 911-NOW mesh network 100 (e.g., including wireless communications capabilities, backhaul functions, networking functions, services, and the like, as well as various combinations thereof).

The existing network infrastructure 201 may include wireless access capabilities (e.g., radio access networks, satellite access networks, and the like, as well as various combinations thereof), backhaul capabilities (e.g., public and/or private, wireline and/or wireless, backhaul networks supporting mobility management functions, routing functions, and gateway functions, as well as various other related functions), core networking capabilities (e.g., AAA functions, DNS functions, DHCP functions, call/session control functions, and the like), services capabilities (e.g., application servers, media servers, and the like), and the like, as well as various combinations thereof. Since 911-NOW nodes 110 also supports such capabilities, in some embodiments at least a portion of these capabilities of existing network infrastructure 201 may only be relied upon when necessary.

As depicted in FIG. 2, the existing network infrastructure 201 supports wireless backhaul connections. Specifically, the existing network infrastructure 201 supports two wireless backhaul connections from 911-NOW mesh network 100. The existing network infrastructure 201 supports a first wireless backhaul connection 214 with 911-NOW node 110$_E$ using a satellite 202, where satellite 202 is in wireless backhaul communication with a satellite backhaul node 203 at the edge of Internet 206. The existing network infrastructure 201 supports a second wireless backhaul connection 214 with 911-NOW node 110$_G$ using a cellular base station 204, where cellular base station in 204 is in wireline backhaul communication with a cellular backhaul node 205 at the edge of Internet 206.

As depicted in FIG. 2, the existing network infrastructure 201 further supports other connections to other locations with which users 102 of emergency site 101 may communicate. The existing network infrastructure 201 includes a router 207 supporting communications for an emergency headquarters 220 (which may include, for example, emergency personnel and/or emergency systems). The existing network infrastructure 201 includes a cellular backhaul node 208 and an associated base station 209 supporting communications for one or more other 911-NOW mesh networks 230$_1$-230$_N$ (i.e., one or more other standalone 911-NOW networks established at remote emergency sites).

The existing network infrastructure 201 supports communications for 911-NOW mesh network 100. The existing network infrastructure 201 may support communications between wireless user devices 104 of 911-NOW mesh network 100 (e.g., complementing wireless mesh communications between 911-NOW nodes 110 of the standalone 911-NOW network 100). The existing network infrastructure 201 may support communications between wireless user devices 104 of 911-NOW mesh network 100 and other emergency personnel and/or emergency systems. For example, existing network infrastructure 201 may support communications between wireless user devices 104 of 911-NOW mesh network 100 and an emergency headquarters 220, one or more other 911-NOW mesh networks 230 (e.g., at emergency sites remote from emergency site 101), and the like, as well as various combinations thereof.

As depicted in FIG. 2, in addition to supporting one or more wireless access interfaces, one or more wireless mesh interfaces, and one or more wireless management interfaces, 911-NOW nodes 110 support one or more wireless backhaul interfaces supporting communications between 911-NOW nodes 110 and existing network infrastructure (illustratively, existing network infrastructure 201). The wireless backhaul communications between 911-NOW nodes 110 and existing network infrastructure 201 are supported using wireless backhaul connections 214 established between 911-NOW nodes 110 and existing network infrastructure 201. The wireless backhaul connections 214 may be provided using one or more wireless technologies, such as GSM, GPRS, EV-DO, UMTS, HSDPA, WiFi, WiMAX, microwave, satellite, and the like, as well as various combinations thereof.

The mesh networking capabilities provided by 911-NOW nodes 110, in combination with backhaul networking capabilities provided by 911-NOW nodes 110 using wireless backhaul connections with the existing network infrastructure 201, enable communications between emergency personnel at one emergency site (e.g., between users connected to 911-NOW nodes 110 of a standalone 911-NOW mesh network), between emergency personnel at different emergency sites (e.g., between users connected to 911-NOW nodes 110 of different standalone wireless mesh networks), between emergency personnel at one or more emergency sites and emergency management personnel (e.g., users stationed at emergency headquarters 220), and the like, as well as various combinations thereof.

Thus, 911-NOW nodes 110 may each support four different types of wireless interfaces. The 911-NOW nodes 110 support one or more wireless access interfaces by which user devices 104 may access 911-NOW nodes 110. The 911-NOW nodes 110 support one or more wireless mesh interfaces by which 911-NOW nodes 110 communicate with other 911-NOW nodes 110. The 911-NOW nodes 110 support one or more wireless backhaul interfaces by which the 911-NOW nodes 110 communicate with existing network infrastructure. The 911-NOW nodes 110 support one or more wireless management interfaces by which network administrators may manage the 911-NOW-based wireless network. The functions of a 911-NOW node 110 may be better understood with respect to FIG. 3.

Figure 3:
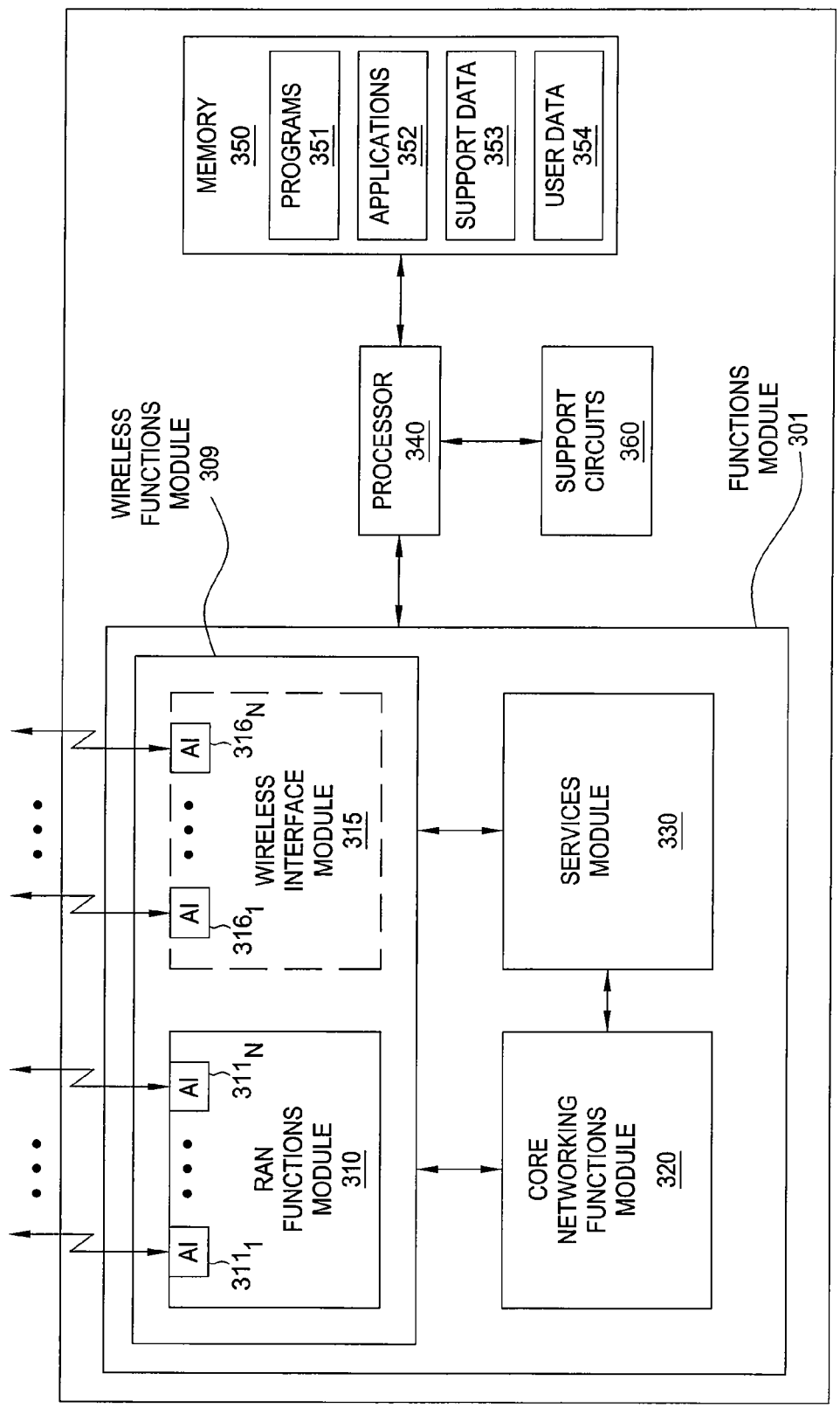
FIG. 3 depicts a high-level block diagram of one embodiment of a 911-NOW node.

FIG. 3 depicts a high-level block diagram (300) of one embodiment of a 911-NOW node. Specifically, as depicted in FIG. 3, 911-NOW node 110 includes a functions module 301, a processor 340, a memory 350, and support circuit(s) 360 (as well as various other processors, modules, storage devices, support circuits, and the like required to support various functions of 911-NOW node 110). The functions module 301 cooperates with processor 340, memory 350, and support circuits 360 to provide various functions of 911-NOW node 110, as depicted and described herein).

The processor 340 controls the operation of 911-NOW node 110, including communications between functions module 301, memory 350, and support circuit(s) 360. The memory 350 includes programs 351, applications 352, support data 353 (e.g., user profiles, quality-of-service profiles, and the like, as well as various combinations thereof), and user data 354 (e.g., any information intended for communication to/from user devices associated with 911-NOW node 110). The memory 350 may store other types of information.

The support circuit(s) 360 may include any circuits or modules adapted for supporting functions of 911-NOW node 110, such as power supplies, power amplifiers, transceivers, encoders, decoders, and the like, as well as various combinations thereof.

The functions module 301 includes a wireless functions module 309, a core (CORE) networking functions module 320, and a services module 330. The wireless functions module 309 includes a radio access network (RAN) functions module 310 and, optionally, a wireless interface module 315. The CORE networking functions module 320 provides CORE networking functions. The services module 330 provides one or more services. The RAN functions module 310 (and, when present, wireless interface module 315) communicate with both CORE networking functions module 320 and services module 330, and CORE networking functions module 320 and services module 330 communicate, to provide functions depicted and described herein.

The wireless functions module 309, CORE networking functions module 320, and services module 330 cooperate (in combination with processor 340, memory 350, and support circuits 360, and any other required modules, controllers, and the like, which are omitted for purposes of clarity) to provide a rapidly deployable wireless node which may form: (1) a single-node, standalone wireless network; (2) a multi-node, standalone wireless network (i.e., using wireless mesh connections between 911-NOW nodes); or (3) an integrated wireless network (i.e., using wireless backhaul connections between one or more 911-NOW nodes and existing network infrastructure and, optionally, using wireless mesh connections between 911-NOW nodes).

The RAN functions module 310 provides RAN functions. The RAN functions include supporting one or more wireless access interfaces for communications associated with wireless user devices. Specifically, RAN functions module 310 supports a plurality of air interfaces (AIs) $311_1$-$311_N$ (collectively, AIs 311). The AIs 311 provide wireless access interfaces supporting communications associated with wireless user devices. For example, AIs 311 may support functions typically provided by a base transceiver station (BTS).

The RAN functions module 310 provides control functions. The control functions may include any control functions typically performed by controllers in radio access networks. For example, the control functions may include functions such as admission control, power control, packet scheduling, load control, handover control, security functions, and the like, as well as various combinations thereof. For example, in one embodiment, the control functions may include functions typically performed by RAN network controllers (RNCs) or similar wireless network controllers.

The RAN functions module 310 provides network gateway functions. The network gateway functions may include any functions typically performed in order to bridge RAN and CORE networks, such as IP session management functions, mobility management functions, packet routing functions, and the like, as well as various combinations thereof. For example, where intended for use with CDMA2000-based wireless technology, the network gateway functions may include functions typically performed by a Packet Data Serving Node (PDSN). For example, where intended for use with GPRS-based and/or UMTS-based wireless technology, the network gateway functions may include functions typically performed by a combination of a GPRS Gateway Support Node (GGSN) and a Serving GPRS Support Node (SGSN).

In one embodiment, RAN functions module 310 may be implemented as a base station router (BSR). In one such embodiment, the BSR includes a base station (BS) or one or more modules providing BS functions, a radio network controller (RNC) or one or more modules providing RNC functions, and a network gateway (NG) or one or more modules providing NG functions. In such embodiments, RAN functions module 310 supports any functions typically supported by a base station router.

The wireless interface module 315 provides one or more wireless interfaces. The wireless interfaces provided by wireless interface module may include one or more of: (1) one or more wireless mesh interfaces supporting communications with other 911-NOW nodes; (2) one or more wireless backhaul interfaces supporting communications with existing network infrastructure; and/or (3) one or more wireless management interfaces supporting communications with one or more management devices. The wireless interface module 315 supports a plurality of air interfaces (AIs) $316_1$-$316_N$ (collectively, AIs 316), which provide wireless interfaces supporting communications associated with one or more of: one or more other 911-NOW nodes, existing network infrastructure, and one or more management devices.

In one embodiment, a 911-NOW node 110 is implemented without wireless interface module 315 (e.g., if the 911-NOW node 110 is not expected to require wireless mesh, backhaul, or management capabilities). In one embodiment, a 911-NOW node 110 includes a wireless interface module 315 supporting a subset of: one or more wireless mesh interfaces, one or more wireless backhaul interfaces, and one or more wireless management interfaces (i.e., the 911-NOW node is tailored depending on whether the 911-NOW node 110 will require wireless management, mesh, and/or backhaul capabilities). In one embodiment, a 911-NOW node 110 includes a wireless interface module 315 supporting each of: one or more wireless mesh interfaces, one or more wireless backhaul interfaces, and one or more wireless management interfaces (i.e., all types of wireless interfaces are available should the 911-NOW node 110 require such wireless capabilities).

The CORE networking functions module 320 provides networking functions typically available from the CORE network. For example, CORE networking functions module 320 may provide authentication, authorization, and accounting (AAA) functions, domain name system (DNS) functions, dynamic host configuration protocol (DHCP) functions, call/session control functions, and the like, as well as various combinations thereof. One skilled in the art knows which functions are typically available from the CORE network.

The services module 330 provides services. The services may include any services capable of being provided to wireless user devices. In one embodiment, for example, services module 330 may provide services typically provided by application servers, media servers, and the like, as well as various combinations thereof. For example, services may include one or more of voice services, voice conferencing services, data transfer services (e.g., high-speed data downloads/uploads, file transfers, sensor data transfers, and the like), video services, video conferencing services, multimedia services, multimedia conferencing services, push-to-talk services, instant messaging services, and the like, as well as various combinations thereof. One skilled in the art knows which services are typically available over RAN and CORE networks.

Although primarily depicted and described herein with respect to a specific configuration of a 911-NOW node including three modules providing wireless functions (including RAN functions and, optionally, additional wireless interfaces and associated interface functions), CORE networking functions, and services, respectively, 911-NOW nodes may be implemented using other configurations for providing wireless functions, CORE networking functions, and services. Similarly, although primarily depicted and described herein with respect to a specific configuration of a functions module providing specific wireless functions, CORE networking functions, and services, functions modules of 911-NOW nodes may be implemented using other configurations for providing wireless functions, CORE networking functions, and services.

Therefore, it is contemplated that at least a portion of the described functions may be distributed across the various functional modules in a different manner, may be provided using fewer functional modules, or may be provided using more functional modules. Furthermore, although primarily depicted and described with respect to specific wireless functions (including RAN functions and, optionally, one or more additional wireless interface functions), CORE networking functions, and services, it is contemplated that fewer or more wireless functions (including RAN functions, optionally, and one or more additional wireless interface functions), CORE networking functions, and/or services may be supported by a 911-NOW node. Thus, 911-NOW nodes are not intended to be limited by the example functional architectures depicted and described herein with respect to FIG. 3.

In emergency situations, emergency vehicles often arrive at and leave from emergency sites at different times, depending on the location from which the emergency vehicles are dispatched and the location of the emergency site. Furthermore, depending on the scope of the emergency, emergency vehicles from one or more neighboring jurisdictions may be dispatched to assist in responding the emergency. As a result, an emergency vehicle may arrive at an emergency site after a rapidly deployable wireless network has already been established at the emergency site (e.g., using rapidly deployable nodes placed on emergency vehicles already at the emergency site), as depicted and described with respect to FIG. 4.

Figure 4:
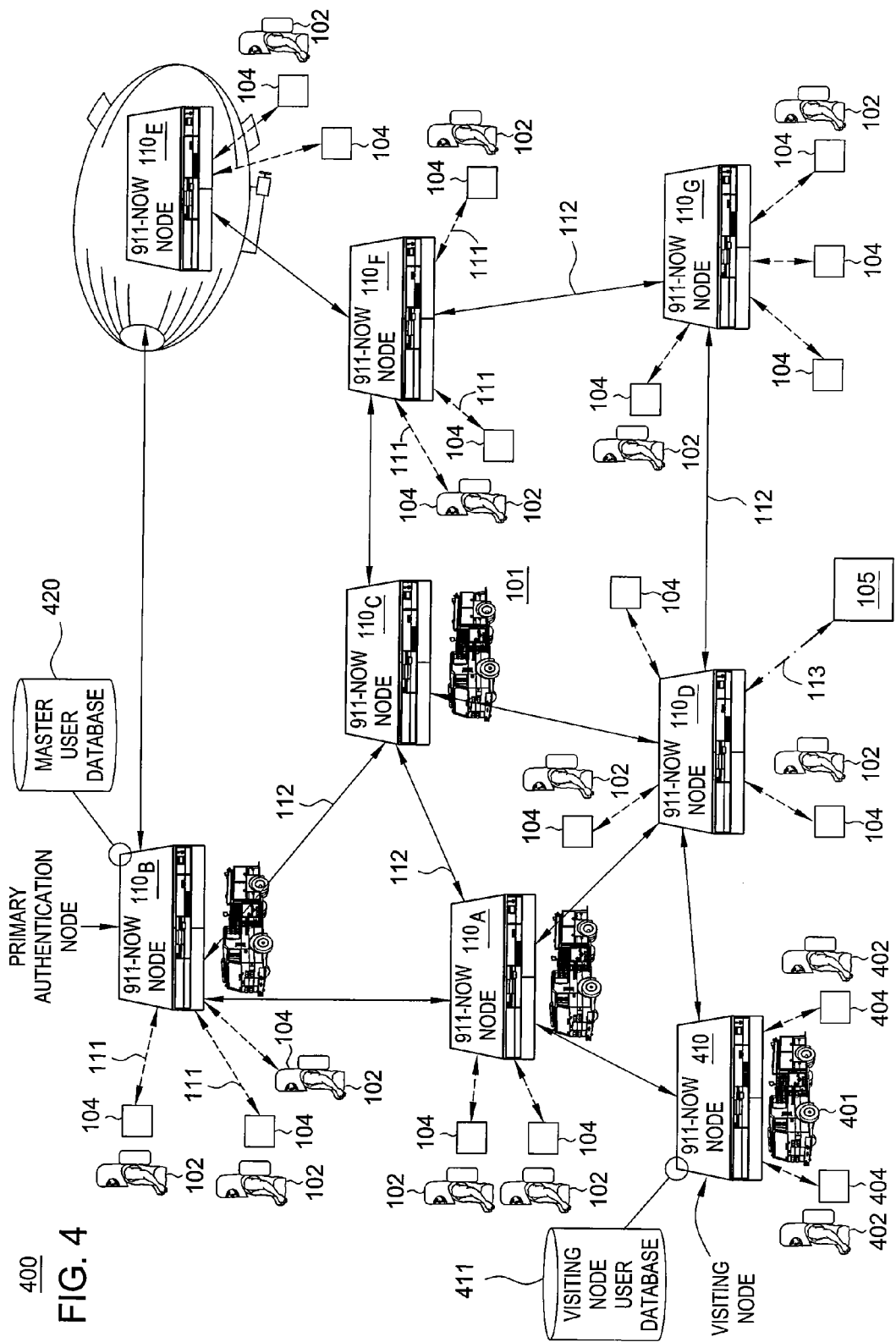
FIG. 4 depicts the 911-NOW communication network architecture of FIG. 3 in which a visiting 911-NOW node arrives at the emergency site.

FIG. 4 (400) depicts the 911-NOW communication network architecture of FIG. 1 in which a visiting 911-NOW node arrives at the emergency site. Although primarily depicted and described within the context of a standalone wireless network (illustratively, standalone wireless network 100 of FIG. 1), the present invention may also be used in an integrated wireless network (e.g., such as the integrated wireless network of FIG. 2). As depicted in FIG. 4, an emergency vehicle 401 (depicted as a fire truck) arrives at emergency site 101. The emergency vehicle 401 includes an additional 911-NOW node 410 (denoted herein as visiting 911-NOW node 410) which, upon arriving at emergency site 101, has not yet associated with the 911-NOW communication network 100 which has already been established at emergency site 101 using 911-NOW nodes 110.

The emergency vehicle 401 transports emergency personnel 402 to emergency site 101. The emergency personnel 402 (more generally referred to herein as users 402) have user devices 404 by which the emergency personnel 402 intend to communicate with each other, as well as with other emergency personnel 102 at emergency site 101, and, optionally, at emergency headquarters 220 and/or one or more of the other 911-NOW mesh networks 230. The users 402 may initially intend to communicate via 911-NOW node 410 and, further, as users 402 move about emergency site 101, via different ones of 911-NOW nodes 110.

As depicted in FIG. 4, during establishment and configuration of 911-NOW communication network 100, one of 911-NOW nodes 110 (illustratively, 911-NOW node $110_B$) is configured as a primary authentication node. The primary authentication node $110_B$ performs user authentication functions and user status verification functions (e.g., verifying user authorization levels, user quality-of-service classes, and the like) for users communicating over (or initially attempting to access) 911-NOW communication network 100. In other words, in one embodiment, primary authentication node 110$_B$ may provide authorization, authentication, and accounting (AAA) functions typically provided by an AAA server in fixed wireless networks (e.g., where such AAA functions are supported as part of the CORE functions provided by 911-NOW nodes 110).

The primary authentication node 110$_B$ performs user authentication functions and user status verification functions (and, potentially, other AM functions and AAA-like functions) using a master user database 420 maintained by primary authentication node 110$_B$. The master user database 420 includes entries for users associated with 911-NOW nodes, which include home 911-NOW nodes and, optionally, visiting 911-NOW nodes. The entries may include one or more user profiles for each of the users associated with 911-NOW nodes. An entry (or entries) for a user includes information for that user, which may include user authentication information, user authorization information, user quality-of-service information, and the like, as well as various combinations thereof.

In one embodiment, distinction between home 911-NOW nodes and visiting 911-NOW nodes may be based on jurisdiction of the emergency vehicles transporting 911-NOW nodes 110 (and, therefore, the users associated with the respective emergency vehicles). For example, 911-NOW nodes 110$_A$, 110$_B$, and 110$_D$ may be associated with a first jurisdiction (e.g., a fire department of a first city), 911-NOW nodes 110$_C$, 110$_E$, 110$_F$, and 110$_G$ may be associated with a second jurisdiction (e.g., an agency of the federal government), and 911-NOW node 410 may be associated with a third jurisdiction (e.g., a fire department of a second city, which may be responding to an emergency in the first city to provide support for the fire department of the first city).

In this example, since the first jurisdiction established the 911-NOW network (including assigning 911-NOW node 110$_B$ to function as the primary authentication node for the 911-NOW network), 911-NOW nodes 110$_A$, 110$_B$, and 110$_D$ are considered home 911-NOW nodes and 911-NOW nodes 110$_C$, 110$_E$, 110$_F$, 110$_G$, and 410 are considered visiting 911-NOW nodes. For a 911-NOW node considered to be a home node, master user database 420 of 911-NOW node 110$_B$ may be preconfigured to include entries for users associated with that 911-NOW node 110. For example, master user database 420 of 911-NOW node 110$_B$ may be preconfigured to include entries for each of the users 102 associated with respective 911-NOW nodes 110$_A$, 110$_B$, and 110$_D$. For a 911-NOW node considered to be a visiting node, master user database 420 of 911-NOW node 110$_B$ may be updated, on-the-fly, in real time, to include entries for each of the users associated with that visiting 911-NOW node.

As described herein, in order for a visiting node to join the 911-NOW network, the visiting node must provide a visiting node user database to the primary authentication node maintaining a master user database for inclusion of the visiting node user database within the master user database, thereby enabling the primary authentication node to perform various authentication, authorization, and like functions for users associated with the visiting node. In continuation of the example described above, assume that visiting 911-NOW nodes 110$_C$, 110$_E$, 110$_F$, and 110$_G$ have each already joined the 911-NOW network, and the 911-NOW node 410 has not yet joined the 911-NOW network.

Upon the arrival of visiting 911-NOW node 410 at emergency site 101, until master user database 420 of primary authentication node 110$_B$ is updated to include entries from visiting node user database 411, users 402 associated with visiting 911-NOW node 410 cannot access 911-NOW communication network 100 (because primary authentication node 110$_B$ cannot authenticate users 402). In order for users 402 to access 911-NOW communication network 100 and communicate over 911-NOW communication network 100, master user database 420 of primary authentication node 110$_B$ must be updated to include user entries from visiting node user database 411 of visiting 911-NOW node 410. A method for updating a master user database of a primary authentication node to include a visiting node user database of a visiting node is depicted and described with respect to FIG. 5.

Figure 5:
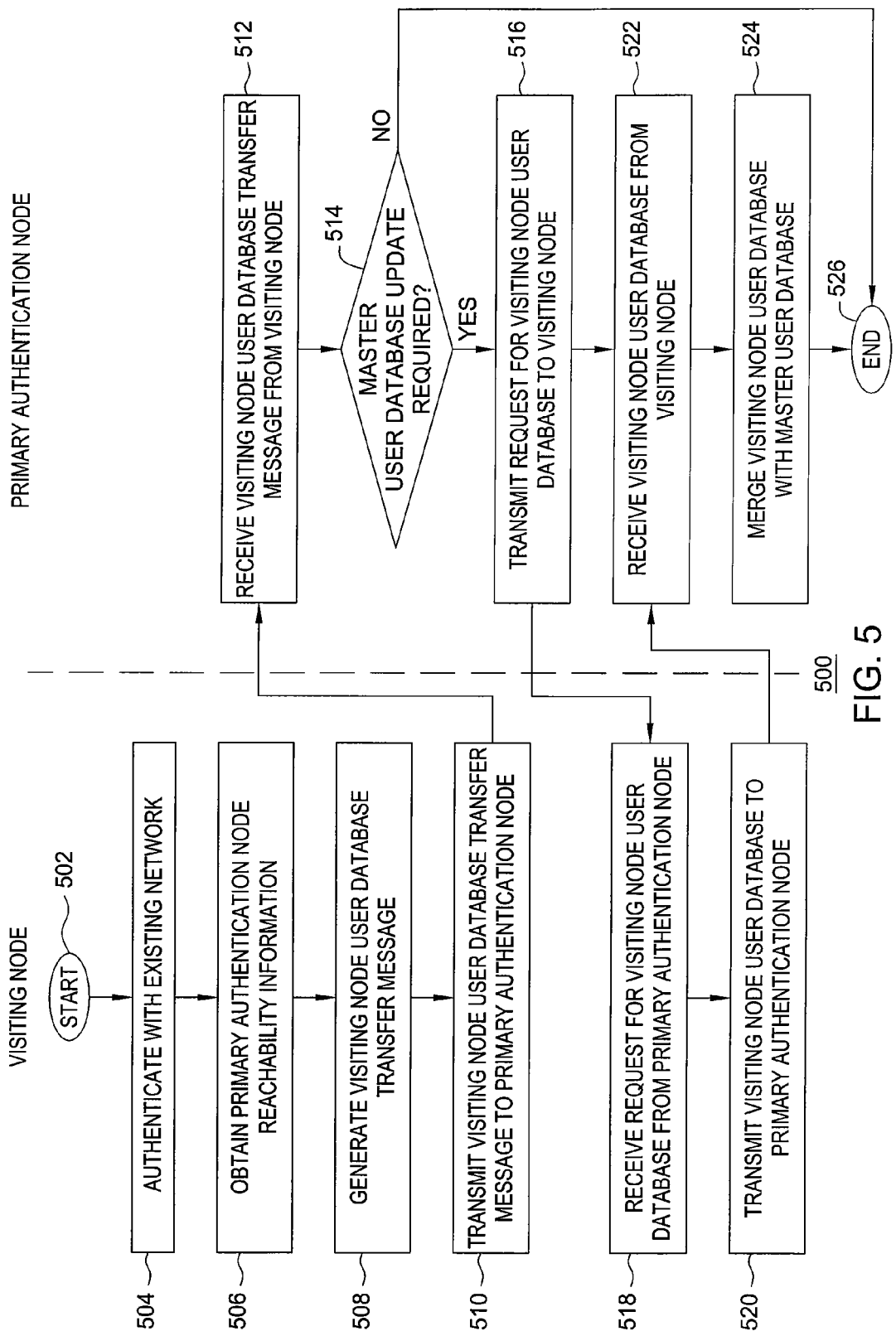
FIG. 5 depicts a method according to one embodiment of the present invention.

FIG. 5 depicts a method according to one embodiment of the present invention. Specifically, method 500 of FIG. 5 includes a method for synchronizing a master user database of a primary authentication node of a network to include a user database of a visiting node to the network. Although depicted and described as being performed serially, at least a portion of the steps of method 500 of FIG. 5 may be performed contemporaneously, or in a different order than depicted and described with respect to FIG. 5. The method 500 begins at step 502 and proceeds to step 504.

At step 504, the visiting node is authenticated with the existing network (illustratively, visiting node 410 authenticates with 911-NOW communication network 100 FIG. 4). In one embodiment, the visiting node authenticates itself to the existing network. At step 506, the visiting node obtains reachability information associated with the primary authentication node of the existing network. The primary authentication node reachability information may include a domain name of the primary authentication node and/or an IP address of the primary authentication node. In one embodiment, the visiting node is auto-configured with the primary authentication node reachability information.

At step 508, the visiting node generates a visiting node user database transfer message (i.e., a message by which the visiting node may inform the primary authentication node that it desires to transfer its visiting node user database to the primary authentication node). In one embodiment, the visiting node user database transfer message includes the origin and version of the visiting node user database. In one embodiment, the visiting node user database transfer message is a TCP/IP message, although any message or associated signaling may be used).

At step 510, the visiting node transmits the visiting node user database transfer message to the primary authentication node. At step 512, the primary authentication node receives the visiting node user database transfer message from the visiting node. In one embodiment, the visiting node user database transfer message traverses the mesh backhaul network established by 911-NOW nodes 110 which form the existing network.

At step 514, the primary authentication node determines whether an update to the master user database (which is maintained by the primary authentication node) is required. The primary authentication node determines whether an update to the master user database is required using information included in the visiting node user database transfer message. In one embodiment, the primary authentication node determines whether an update to the master user database is required using the origin and version of the visiting node user database, where such information is included in the visiting node user database transfer message. In other embodiments, the primary authentication node may determine whether an update to the master user database is required using other information (e.g., in place of or in conjunction with visiting node user database origin and version information).

In other words, the primary authentication node determines whether the master user database already includes user entries for users associated with the visiting node (i.e., whether the master user database is currently up to date). If the primary authentication node determines that an update to the master user database is not required (i.e., the master user database already includes up-to-date entries for users associated with the visiting node), method 500 proceeds to step 526, where method 500 ends. If the primary authentication node determines that an update to the master user database is required (i.e., the master user database does not includes entries for users associated with the visiting node, or does include such entries but the entries are out-of-date), method 500 proceeds to step 516.

At step 516, the primary authentication node transmits a request for the visiting node user database to the visiting node. At step 518, the visiting node receives the request for the visiting node user database from the primary authentication node. At step 520, the visiting node transmits the visiting node user database to the primary authentication node. At step 522, the primary authentication node receives the visiting node user database from the visiting node. Although depicted and described with respect to a specific combination of steps, the primary authentication node essentially initiates transfer of the visiting node user database from the visiting node to the primary authentication node (and the transfer may be achieved by any means of completing such a transfer).

At step 524, the primary authentication node merges the visiting node user database into the master user database, i.e., merging the user entries of the visiting node user database with user entries of the master user database. Thus, the merge of the visiting node user database into the master user database includes adding user entries from the visiting node user database to the master user database, thereby enabling the primary authentication node to perform user authentication functions and user status verification functions for users associated with the visiting node. The merge of the visiting node user database into the master user database may be performed using any database merging techniques applicable to the types of databases, and associated information, being merged. At step 526, method 500 ends.

Although omitted for purpose of clarity, following the merge of the visiting node user database into the master user database, the primary authentication node may then perform user authentication functions and user status verification functions, as described herein. Similarly, although omitted for purposes of clarity, upon detecting that the visiting node is no longer associated with the existing network (e.g., the emergency vehicle on which the visiting node was mounted leaves the emergency site), the primary authentication node may maintain the master user database entries for the users associated with that visiting node or, alternatively, may delete the master user database entries for the users associated with that visiting node (i.e., purging the master user database of entries associated with that visiting node).

Figure 6:
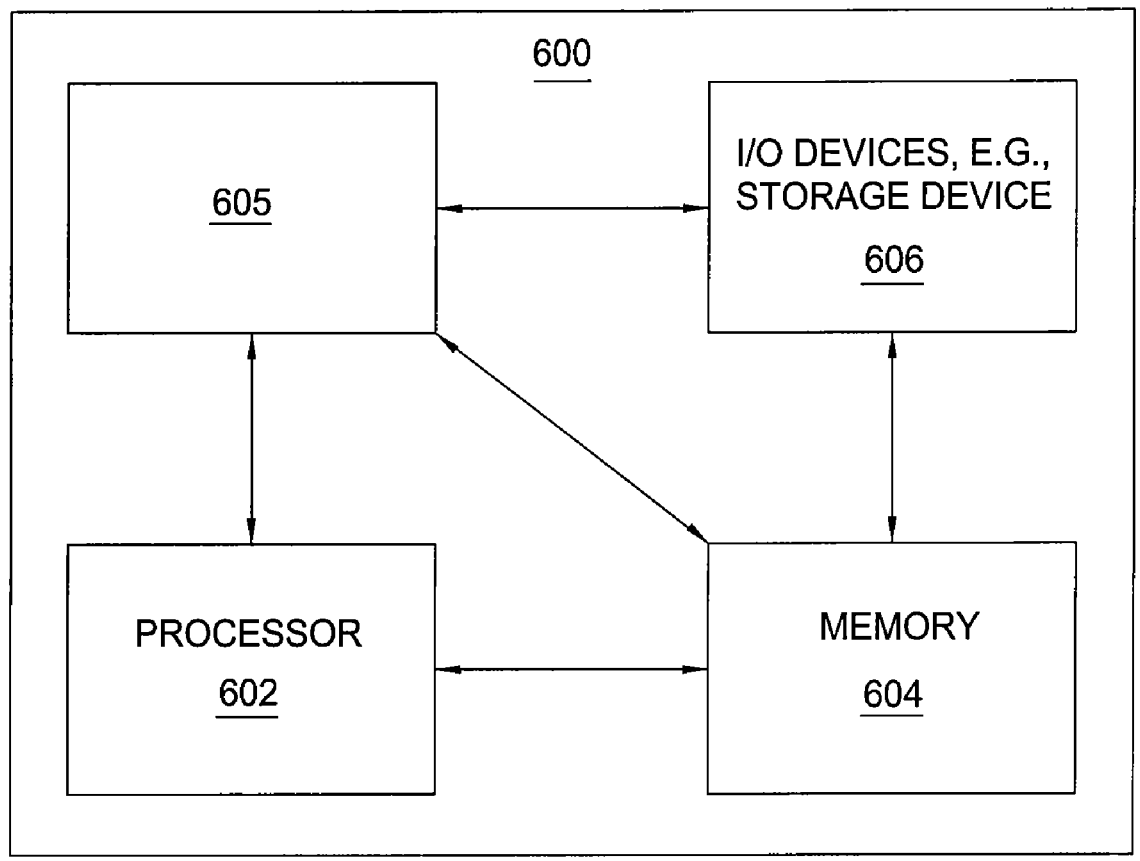
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, system 600 comprises a processor element 602 (e.g., a CPU), a memory 604, e.g., random access memory (RAM) and/or read only memory (ROM), a user database merge module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present user database merge process 605 can be loaded into memory 604 and executed by processor 602 to implement the functions as discussed above. As such, user database merge process 605 (including associated data structures) of the present invention can be stored on a computer readable medium, e.g., RAM memory, magnetic or optical drive or diskette, and the like.

Although primarily depicted and described herein with respect to using rapidly deployable nodes (such as 911-NOW nodes depicted and described herein) to deploy a wireless network in emergency response situations, rapidly deployable nodes may be used to deploy a wireless network in various other situations. In one embodiment, rapidly deployable nodes may be used in large-crowd environments. For example, rapidly deployable nodes may be deployed during large-crowd events, such as sporting events (e.g., in a city hosting the Super Bowl, in a city hosting the Olympics, and the like), concerts, and the like. In one embodiment, rapidly deployable nodes may be used as a rapid replacement network for commercial cellular networks (i.e., to replace existing network infrastructure while such infrastructure is unavailable). In one embodiment, rapidly deployable nodes may be used in military environments (e.g., to form a rapidly deployable network on the battlefield or in other situations).

Therefore, rapidly deployable nodes according to the present invention are useful for various other applications in addition to emergency response applications, and, thus, may be deployed in various other situations in addition to emergency situations. Thus, the term "emergency site", which is used herein to denote the geographical location in which one or more rapidly deployable nodes may be deployed to form a wireless network, may be more commonly referred to as a "network site" (i.e., the site at which the rapidly deployable wireless network is deployed to support wireless communications). Similarly, other terms primarily associated with emergency applications may be referred to more generally depending upon the application in which rapidly deployable nodes are deployed. In other words, any number of rapidly deployable nodes according to the present invention may be deployed to any geographical location to form a wireless network for any reason.

Furthermore, although primarily depicted and described with respect to rapidly deployable networks, the present invention may be used in various other ad-hoc networks. The present invention is advantageous in any ad hoc network in which different user communities must be authenticated before being permitted to access the network and, further, in which user access privileges, user authorization levels, user quality-of-service profiles, and the like, require dynamic updates. The present invention provides a simplified, scalable method of incorporating new user communities into an existing user community without having to rely on the infrastructure of the new user community (e.g., without having to rely on availability of, and connectivity between, primary and secondary AAA servers).

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for enabling a visiting node providing a wireless communication network to join a network including a plurality of nodes, the method comprising:
   receiving, from the visiting node, a request to transfer a user database of the visiting node, wherein the visiting node user database includes user entries for users associated with the visiting node;
   in response to a determination to update a master user database associated with the network to include the visiting node user database, obtaining the visiting node user database from the visiting node; and
   merging the visiting node user database with the master user database, thereby joining the wireless communication network provided by the visiting node to the network including the plurality of nodes.

2. The method of claim 1, wherein the request to transfer the visiting node user database includes an origin identifier of the visiting node user database and a version number of the visiting node user database.

3. The method of claim 1, wherein obtaining the visiting node user database from the visiting node comprises:
   initiating, to the visiting node, a request for the visiting node user database; and
   receiving the visiting node user database from the visiting node.

4. The method of claim 1, wherein merging the visiting node user database with the master user database comprises:
   adding at least one of the user entries of the visiting node user database to the master user database.

5. The method of claim 1, wherein each of the user entries includes user authentication information and at least one of user authorization information and user quality-of-service information.

6. The method of claim 1, wherein the visiting node comprises a base station.

7. The method of claim 1, wherein the master user database includes user entries for users associated with existing nodes of the network.

8. The method of claim 1, wherein the master user database supports a primary AAA server for the network.

9. The method of claim 1, further comprising:
   receiving, from one of the users of the visiting node, a request to access the network;
   in response to identifying, in the master user database, a user entry associated with the one of the users of the visiting node, authenticating the one of the users of the visiting node; and
   providing access to the network for the one of the users of the visiting node.

10. An apparatus for enabling a visiting node providing a wireless communication network to join a network, including a plurality of nodes, the apparatus comprising:
    processor configured to perform:
    means for receiving, from the visiting node, a request to transfer a user database of the visiting node, wherein the visiting node user database includes user entries for users associated with the visiting node;
    means for obtaining the visiting node user database from the visiting node in response to a determination to update a master user database associated with the network to include the visiting node user database; and
    means for merging the visiting node user database with the master user database thereby joining the wireless communication network provided by the visiting node to the network including the plurality of nodes.

11. The apparatus of claim 10, wherein the request to transfer the visiting node user database includes an origin identifier of the visiting node user database and a version number of the visiting node user database.

12. The apparatus of claim 10, wherein the means for obtaining the visiting node user database from the visiting node comprises:
    means for initiating, to the visiting node, a request for the visiting node user database; and
    means for receiving the visiting node user database from the visiting node.

13. The apparatus of claim 10, wherein the means for merging the visiting node user database with the master user database comprises:
    means for adding at least one of the user entries of the visiting node user database to the master user database.

14. The apparatus of claim 10, wherein each of the user entries includes user authentication information and at least one of user authorization information and user quality-of-service information.

15. The apparatus of claim 10, wherein the visiting node comprises a base station.

16. The apparatus of claim 10, wherein the master user database includes user entries for users associated with existing nodes of the network.

17. The apparatus of claim 10, wherein the master user database supports a primary AAA server for the network.

18. The apparatus of claim 10, further comprising:
    means for receiving, from one of the users of the visiting node, a request to access the network;
    means for authenticating the one of the users of the visiting node in response to identifying, in the master user database, a user entry associated with the one of the users of the visiting node; and
    means for providing access to the network for the one of the users of the visiting node.

19. A non-transitory computer readable medium storing a software program, that, when executed by a computer, causes the computer to perform a method comprising:
    receiving, from a visiting node providing a wireless communication network, a request to transfer a user database of the visiting node, wherein the visiting node user database includes user entries for users associated with the visiting node;
    in response to a determination to update a master user database associated with the network to include the visiting node user database, obtaining the visiting node user database from the visiting node; and
    merging the visiting node user database with the master user database thereby joining the wireless communication network provided by the visiting node to the network.

20. The computer readable medium of claim 19, further comprising:
    receiving, from one of the users of the visiting node, a request to access the network;
    in response to identifying, in the master user database, a user entry associated with the one of the users of the visiting node, authenticating the one of the users of the visiting node; and
    providing access to the network for the one of the users of the visiting node.

* * * * *